United States Patent [19]
Kang et al.

[11] Patent Number: 5,501,408
[45] Date of Patent: Mar. 26, 1996

[54] JOG DEVICE FOR MAGNETIC RECORDING AND REPRODUCING APPARATUS

[75] Inventors: Seong-Sik Kang; Sung-Hoon Choi, both of Kyungki; Myung-Cheol Baek, Seoul; Sung-Pyo Hong, Kyungki; Ji Y. Lee; Lee H. Ryu, both of Seoul; Soo-Beom Lee, Kyungki; Hee Y. Park, Kyungki; Yoon-Sig Lee, Kyungki, all of Rep. of Korea

[73] Assignee: Goldstar Co., Ltd., Seoul, Rep. of Korea

[21] Appl. No.: 308,300

[22] Filed: Sep. 19, 1994

[30] Foreign Application Priority Data

Sep. 20, 1993 [KR] Rep. of Korea ............. 1993-19072

[51] Int. Cl.⁶ ........................................... G11B 15/44
[52] U.S. Cl. ............................................. 242/356.5
[58] Field of Search ..................... 242/356, 356.3, 242/356.5, 356.7; 360/96.3, 96.4

[56] References Cited

U.S. PATENT DOCUMENTS

| | | | |
|---|---|---|---|
| 3,501,111 | 3/1970 | Procop | 242/356.7 |
| 4,330,098 | 5/1982 | Santoro | 242/356 |
| 5,289,989 | 3/1994 | Park | 242/356 |
| 5,295,638 | 3/1994 | Lee | 242/356 |
| 5,355,266 | 10/1994 | Kim | 360/96.3 |
| 5,438,466 | 8/1995 | Koguchi et al. | 360/96.4 |

FOREIGN PATENT DOCUMENTS 2059663  4/1981  United Kingdom ............. 360/96.3

*Primary Examiner*—John P. Darling

[57] ABSTRACT

A jog device for magnetic recording and reproducing apparatus. The jog device temporarily rotates a clutch gear of the tape supply reel clutch during a mode conversion from a normal-direction reproducing mode into a reverse-direction reproducing mode. The jog device includes a clutch gear rotating unit, a rotating unit drive member, and a returning unit. The rotating unit includes a jog lever and a gear lever cooperating with the jog lever and selectively rotating the clutch gear. The drive member is a cam gear having a pinion gear gearing into and cooperating with a rack gear of a mode conversion function plate. The cam gear has a cam slot cooperating with a cam pin of the rotating unit. The returning unit includes a coiled torsion spring fitted over a shaft of the rotating unit and a pair of spring arm stoppers.

6 Claims, 6 Drawing Sheets

FIG. 2
CONVENTIONAL ART

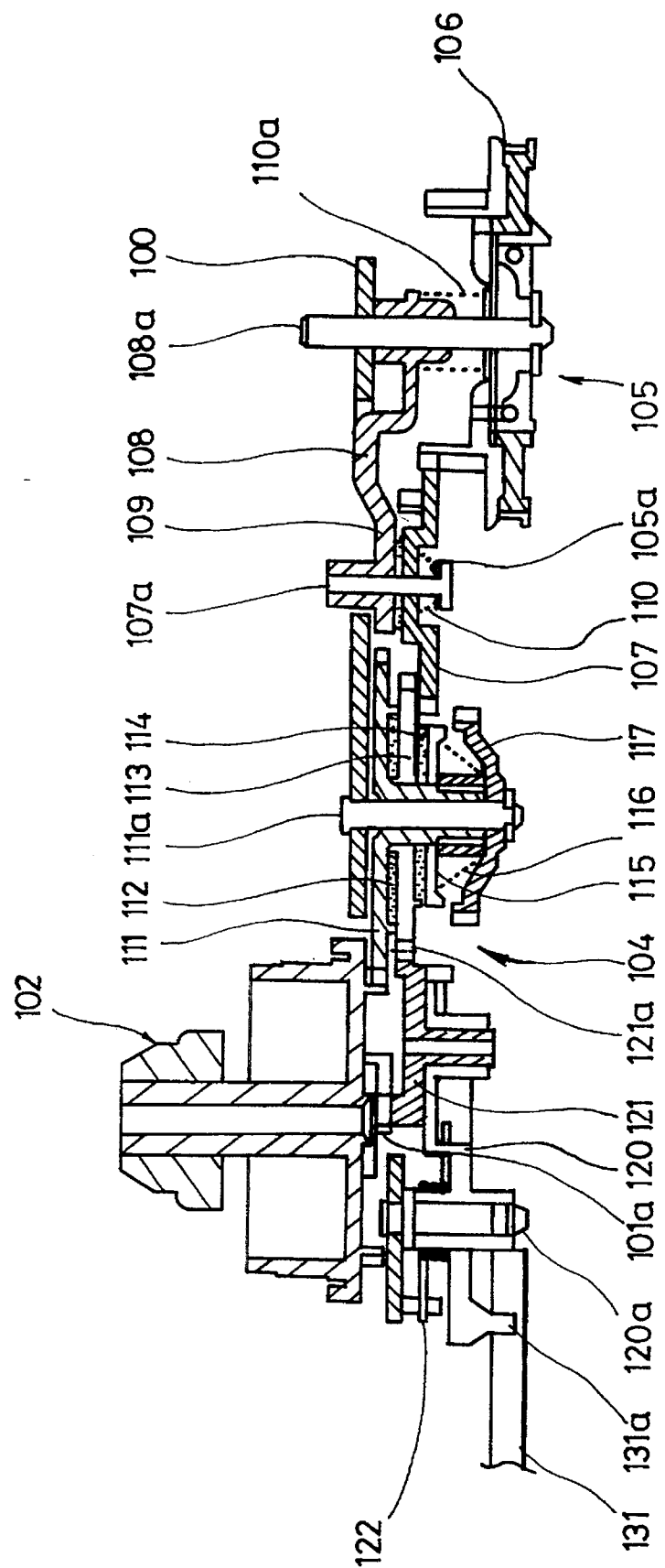

JOG DEVICE FOR MAGNETIC RECORDING AND REPRODUCING APPARATUS

BACKGROUND OF THE INVENTION

1. Field of the Invention

The present invention relates in general to a jog device for magnetic recording and reproducing apparatus and, more particularly, to a structural improvement in such a jog device for prevention of screen noise caused by either abrupt variation of tape tension or variation of length of the tape running passage in the case of conversion of mode of the apparatus from a normal-direction reproducing mode into a reverse-direction reproducing mode.

2. Description of the Prior Art

With reference to FIG. 1, there is shown magnetic recording and reproducing apparatus having a typical jog device. As shown in this drawing, a power transmission mechanism of the above apparatus includes a capstan motor 19 for rotating a capstan shaft 19b. The capstan motor 19 coupled to the capstan shaft 19b is mounted on the top surface of a base plate 1 at the right side of the base plate 1. Fitted over the capstan shaft 19b above the top surface of the capstan motor 19 is a pulley 19a whose bottom surface comes into close contact with the top surface of the capstan motor 19. A gear pulley 5 is rotatably mounted on a shaft 8a fixed to the base plate 1 about the capstan motor 19. The pulley 5 is connected to the pulley 19a of the capstan motor 19 through a belt 18 wrapped about both the pulleys 5 and 19a. A spring 10a is fitted over the shaft 8a under the gear pulley 5 as shown in FIG. 2. The power transmission mechanism also includes an idler arm 8 whose one end or a boss type end is connected to the shaft 8a of the gear pulley 5 but whose other end or a simple rod type end is connected to an idler shaft 7c. That is, the idler arm 8 is connected to the gear pulley shaft 8a and the idler shaft 7c at its opposed ends respectively, thus to rotatably support the idler 7 that is placed under the gear pulley 5.

As shown in FIG. 2, the idler 7 and the idler arm 8 are connected to each other through a felt 9, a spring 10 and a washer 5a so that a predetermined frictional torque is generated by the felt 9, the spring 10 and the washer 5a in response to rotation of the idler arm 8. In the idler 7, a large idler gear 7a and a small idler gear 7b are integrally fitted over the idler shaft 7c. That is, the idler 7, which includes the small idler gear 7b intending to gear into a clutch gear 13 during a normal speed running mode of the tape and the large idler gear 7a intending to gear into a no-slip drive gear 17 during a FF/REW mode of the tape, is mounted on the rod type end of the idler arm 8 with the felt 9 interposed between the idler 7 and the idler arm 8. The spring 10, which is adapted for biasing the idler 7 toward the idler arm 8 and causing a frictional force to be generated in the felt 9, is supported by the washer 5a which in turn rotatably support the idler 7 on the idler arm 8. The large idler gear 7a always gears into a pulley gear 5b of the gear pulley 5, which gear pulley 5 is rotated by the rotating force of the capstan motor 19 transmitted to the pulley 5 through the belt 18.

As shown in FIG. 1, a clutch 4 is mounted on a shaft 11a fixed to the base plate 1 by the left side of the idler 7. The clutch 4 comprises a reel drive gear 11, a first friction member 12, the clutch gear 13, a second friction member 14, a disc 15, a coil spring 16, the no-slip drive gear 17 directly coupled to the reel drive gear 11, and a slitted washer 17a as shown in FIG. 3. All of the above elements of the clutch 4 are fitted over the shaft 11a in order. That is, the reel drive gear 11 of the clutch 4, which will gear into a tape supply reel gear 2a placed under a tape supply reel assembly 2, is fitted over the shaft 11a at the bottom position. Extending upward from the center of the reel drive gear 11 are a polygonal shaft 11e and a cylindrical shaft 11d. Here, the cylindrical shaft 11d extends from the top of the polygonal shaft 11e upwardly. Fitted over the shaft 11a above the reel drive gear 11 is the clutch gear 13 which will gear into the small idler gear 7b of the idler 7. The first and second friction members 12 and 14 of the hollow disc type are placed on the bottom surface and the top surface of the clutch gear 13 respectively. The center of the clutch gear 13 is provided with a polygonal hole 13e which will receive the polygonal shaft 11e of the reel drive gear 11 therein. The shape of the polygonal hole 13e of the clutch gear 13 corresponds to the outer appearance of the polygonal shaft 11e of the reel drive gear 11. In the same manner, the center of the disc 15 is provided with a polygonal hole 15e. The coil spring 16 is fitted over the cylindrical shaft 11d of the reel drive gear 11 and supported by the no-slip drive gear 17 rotating along with the reel drive gear 11. The coil spring 16 thus biases the disc 15 toward the reel drive gear 11, thus to cause frictional force to be generated in both the first and second friction members 12 and 14. The slitted washer 17a is fitted over the top section of the shaft 11a after fitting the no-slip drive gear 17 over the shaft 11a, thus to retain the predetermined positions of the clutch elements orderly fitted over the shaft 11a.

In the apparatus, the gear pulley 5, the idler arm 8 and the idler 7 constitute a so-called idler mechanism. The idler mechanism is engaged with either the clutch 4 of the tape supply reel assembly 2 or a clutch (not shown) of a tape take-up reel assembly (not shown) in response to rotating direction of the gear pulley 5, thus to drive either the supply reel assembly 2 or the take-up reel assembly. Here, the idler mechanism is driven by the rotating force of a rotational force source such as the capstan motor 19. Here, it should be understood that an additional clutch may be provided in the tape supply reel assembly 2 having the aforementioned clutch 4.

A tape supply reel shaft 2c is fixed to the base plate 1 by the left side of the clutch 4. The tape supply reel gear 2a which is integrally fitted in the tape reel assembly 2, is fitted over the tape supply reel shaft 2c.

Rotatably mounted on a shaft 40c under the supply reel assembly 2 is a power transmission gear 40 having a projection 40a at a predetermined position thereof. A jog gear 36 partially provided with teeth is rotatably mounted on an end of an arm 33 by a pin 34 in the right side of the power transmission gear 40. The center of the arm 33 is coupled to a lever 37 by a pin 35. The lever 37 which is rotatably mounted on a bracket 30 is provided with a bent portion 37a on the outside edge of the lever 37 by the side of the power transmission gear 40. A stopper 30a for prevention of clockwise rotation of the lever 37 extends from the bracket 30 as shown in FIG. 1. Another stopper 30b for prevention of rotation of the arm 33 is mounted on the bracket 30 so that the stopper 30b comes into contact with the jog gear 36.

One end of the arm 33 is coupled to one end of the lever 37 by a spring 32. In the same manner, the other end of the lever 37 is coupled to a fixture 38a of the bracket 30 by a spring 38. Here, the fixture 38 denotes a portion of the bracket 30 where the spring 38 is coupled to the bracket 30.

The operation of the magnetic recording and reproducing apparatus will be described hereinbelow.

In a PLAY mode or a normal-direction reproducing mode, the capstan motor 19 is rotated counterclockwise so that the counterclockwise rotating force of the capstan motor 19 is transmitted to the gear pulley 5 through the belt 18. At this time, the gear pulley 5 is rotated counterclockwise in the same rotating direction of the capstan motor 19. As a result of counterclockwise rotation of the gear pulley 5, the idler 7 and idler arm 8 are rotated counterclockwise about the shaft 8a, thus to rotate the clutch gear (not shown) of the tape take-up reel clutch and in turn rotate the tape take-up reel (not shown). The take-up reel thus takes up the magnetic tape (not shown) thereon.

In a REVIEW mode, the capstan motor 19 is rotated clockwise so that the clockwise rotating force of the capstan motor 19 is transmitted to the gear pulley 5 through the belt 18. At this time, the gear pulley 5 is rotated clockwise in the same rotating direction of the capstan motor 19. As a result of clockwise rotation of the gear pulley 5, the idler 7 and idler arm 8 are rotated clockwise about the shaft 8a, thus to render the small idler gear 7b of the idler 7 rotating the clutch gear 13 of the tape supply reel clutch 4. The rotating force of the clutch gear 13 is thus transmitted to the reel drive gear 11 with a predetermined rotating torque through the first friction member 12, which friction member 12 is biased toward the reel drive gear 11 by the coil spring 16 and comes into close contact with the reel drive gear 11. The reel drive gear 11 is thus rotated and, as a result, rotates the tape supply reel gear 2a placed under the tape supply reel assembly 2, thus to make the tape supply reel take up the magnetic tape thereon.

In a FF (Fast Forward) mode, the idler arm 8 is descended by an additional conversion member (not shown) so that the small idler gear 7b is disengaged from the clutch gear 13 but the large idler gear 7a gears into a no-slip drive gear 17. The rotating force of the idler 7 is thus transmitted to the no-slip drive gear 17, thus to rotate the no-slip drive gear 17. As a result of rotation of the no-slip drive gear 17, the reel drive gear 11 is rotated so that the rotating force of the reel drive gear 11 is transmitted to the tape supply reel assembly 2 at a high speed with a high rotating torque through neither the first friction member 12 nor the second friction member 14. In the same manner as described for the tape supply reel assembly 2 in the FF mode, the tape take-up reel assembly (not shown) in the FF mode is transmitted with the rotating force of the reel drive gear 11 at the high steep with the high rotating torque.

Hereinbelow, the operation of the jog device for the magnetic recording and reproducing apparatus will be given.

Conventionally, the jog operation is carried out for reproducing a picture simultaneously with moving the picture by one frame in normal direction or in reverse direction in a STILL mode. With the jog device, one picture will be repeatedly reproduced in the STILL mode. The STILL mode means that the capstan motor 19 is stopped during a PLAY mode. In this STILL mode, the idler 7 engages with the clutch gear (not shown) of the tape take-up reel. When a reverse-direction jog operation for reproducing one picture or one frame while moving the picture in the reverse direction is carded out, the capstan motor 19 is somewhat rotated clockwise, thus to clockwise rotate the idler 7 about the idler shaft 7c. However, since the interval between the pictures of the magnetic tape is extremely short, for example, 58 μm, the capstan motor 19 is not sufficiently rotated and this causes the idler 7 to be not precisely engaged with the clutch gear 13 of the clutch 4.

When the reverse-direction jog operation is continued in the above state, the clockwise rotation of the capstan motor 19 is continued, thus to cause the idler 7 to be continuously rotated and, as a result, precisely engaged with the clutch gear 13 of the tape supply reel. The rotating force of the capstan motor 19 is, therefore, precisely transmitted to the tape supply reel assembly 2 so that the tape supply reel takes up the magnetic tape thereon. At this time, the rotation of the capstan motor 19 is continued until the idler 7 has changed its engagement from the tape take-up reel clutch gear (not shown) to the tape supply reel clutch gear 13. The magnetic tape is thus fed continuously. However, as the idler 7 is not engaged with the tape supply reel clutch gear 13 of the tape supply reel, the tape supply reel assembly 2 can not take up the magnetic tape. In this regard, the tension of the tape about the rotary head drum (not shown) is loose so that the head drum can not read out the signals recorded on the tape and this causes the noise to be generated on the picture. In order to combat this problem, the jog gear 36, the arm 33 and the lever 37 are installed by the side of the tape supply reel clutch 4 such that the teeth of the jog gear 36 are selectively engaged with the no-slip drive gear 17. In addition, the power transmission gear 40 having the projection 40a is rotatably mounted on the shaft 40c by the side of the arm 33.

During the reverse-direction jog operation in the STILL mode, in which STILL mode a specific picture is repeatedly reproduced, the capstan motor 19 rotates the power transmission gear 40 clockwise using the rotating force of an additional drive source, for example, a loading motor that provides the rotating force required in moving the elements of the magnetic recording and reproducing apparatus prior to a desired operation of the apparatus, before the capstan motor 19 is rotated clockwise. The projection 40a of the power transmission gear 40 thus pushes the bent portion 37a of the lever 37, so that the lever 37 is turned counterclockwise about the pin 35. As a result of the counterclockwise turning motion of the lever 37, the tension coil spring 32 is tensioned, thus to cause the arm 33 to be rotated counterclockwise about the pin 35. At this time, the teeth of the jog gear 36, which jog gear 36 is rotated along with the arm 33, are engaged with teeth of the no-slip drive gear 17 of the tape supply reel clutch 4. As a result of the counterclockwise rotation of the am 33, the teeth of the jog gear 36 rotate the no-slip drive gear 17 clockwise and in turn rotate the tape supply reel assembly 2 counterclockwise. Hence, the tape supply reel takes up the magnetic tape thereon, thus to cause the tape about the head drum to be tensioned. At this time, the capstan motor 19 is rotated clockwise, so that the tape is unwound from the reel so as to control the tension of the tape about the head dram. When the reverse-direction jog operation is continued, the above procedure is repeated.

When a normal-direction jog operation or a normal-direction reproducing operation is carried out at the above state, the power transmission gear 40 is rotated counterclockwise, thus to cause the projection 40a of the gear 40 to be disengaged from the bent portion 37a of the lever 37. The lever 37 is thus rotated clockwise by the restoring force of the spring 38. The clockwise rotation of the lever 37 causes the arm 33 to be rotated clockwise along with the jog gear 36. Thus, the teeth of the jog gear 36 come into contact with the teeth of the no-slip drive gear 17. However, as the jog gear 36 is rotated counterclockwise about the fixing pin 34, the no-slip drive gear 17 is not rotated.

It has been noted that the above jog device for the magnetic recording and reproducing apparatus has the following problems.

Since the jog gear 36 is directly transmitted with the rotating force of the loading motor (not shown) and directly transmits the rotating force of the loading motor to the tape supply reel assembly 2. In this regard, the rotating torque of the tape supply reel assembly 2 is increased. The typical jog device thus has a problem that the device causes the tape supply reel assembly 2 to take up the tape thereon with high rotating torque. Furthermore, as the typical jog device feeds the magnetic tape using the rotating force of the capstan motor 19 in the reverse-direction jog operation, the tension of the tape about the head drum is continuously increased when repeating such a jog operation several times. Such continuous increase of the tape tension about the head drum causes abrasion of the head, damage of the magnetic tape and sticking of impurities on the head.

SUMMARY OF THE INVENTION

It is, therefore, an object of the present invention to provide a jog device for magnetic recording and reproducing apparatus in which the above-mentioned problems can be overcome and which prevents screen noise caused by either abrupt variation of tape tension or variation of length of the tape running passage in the case of conversion of mode of the magnetic recording and reproducing apparatus from a normal-direction reproducing mode into a reverse-direction reproducing mode.

In order to accomplish the above object, a jog device for magnetic recording and reproducing apparatus in accordance with an embodiment of the present invention comprises: rotating means for temporarily rotating a clutch gear of a tape supply reel assembly during conversion of mode of the magnetic recording and reproducing apparatus from a normal-direction reproducing mode into a reverse-direction reproducing mode, thus to cause the tape supply reel assembly to be rotated by clutch force during the mode conversion.

BRIEF DESCRIPTION OF THE DRAWINGS

The above and other objects, features and other advantages of the present invention will be more clearly understood from the following detailed description taken in conjunction with the accompanying drawings, in which:

Figure 2:
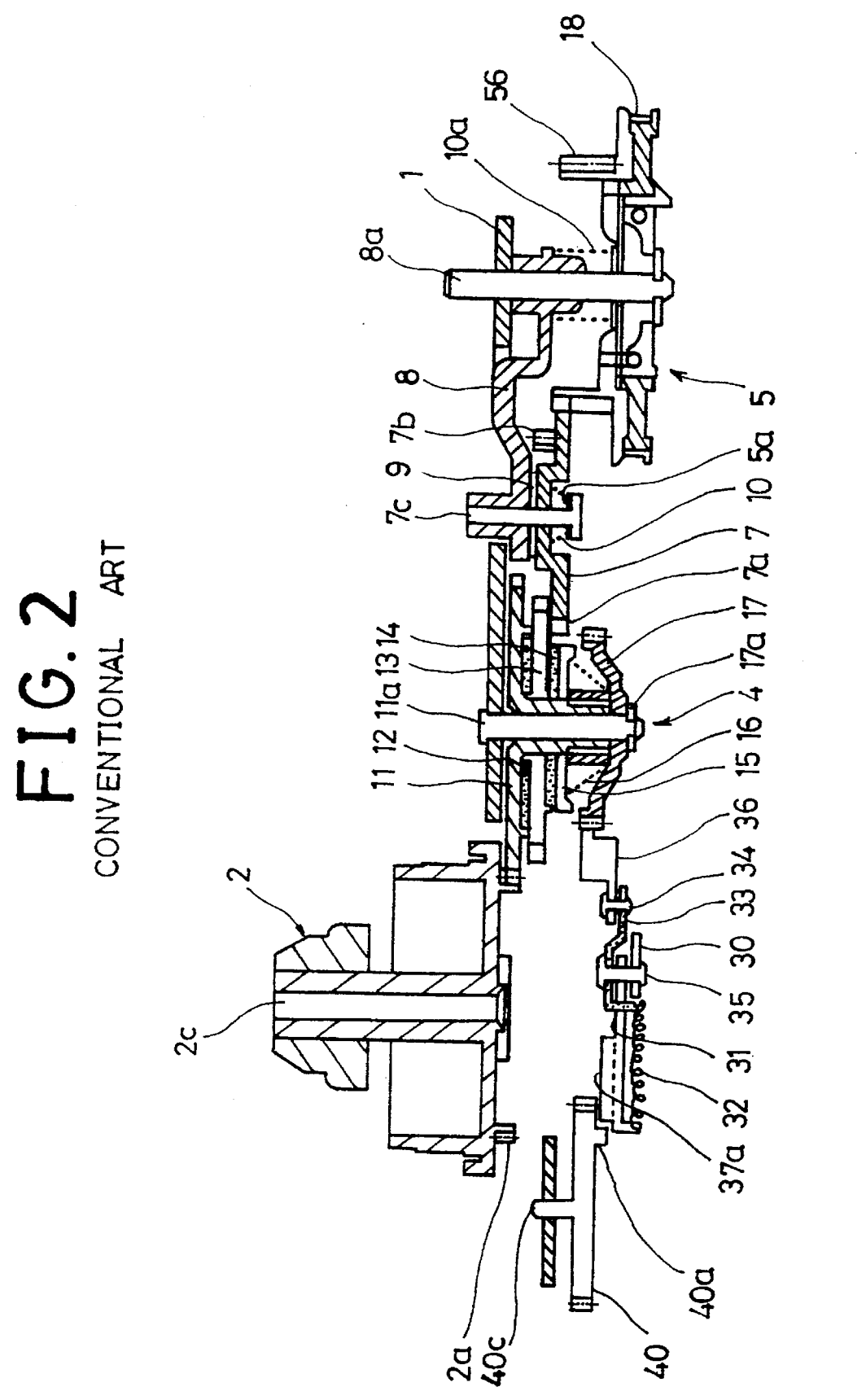

FIG. 2 is a schematic sectional view of the magnetic recording and reproducing apparatus having the typical jog device of FIG. 1;

FIG. 6 is a schematic sectional view of the magnetic recording and reproducing apparatus having the jog device of FIG. 5.

DESCRIPTION OF THE PREFERRED EMBODIMENTS

Figure 1:
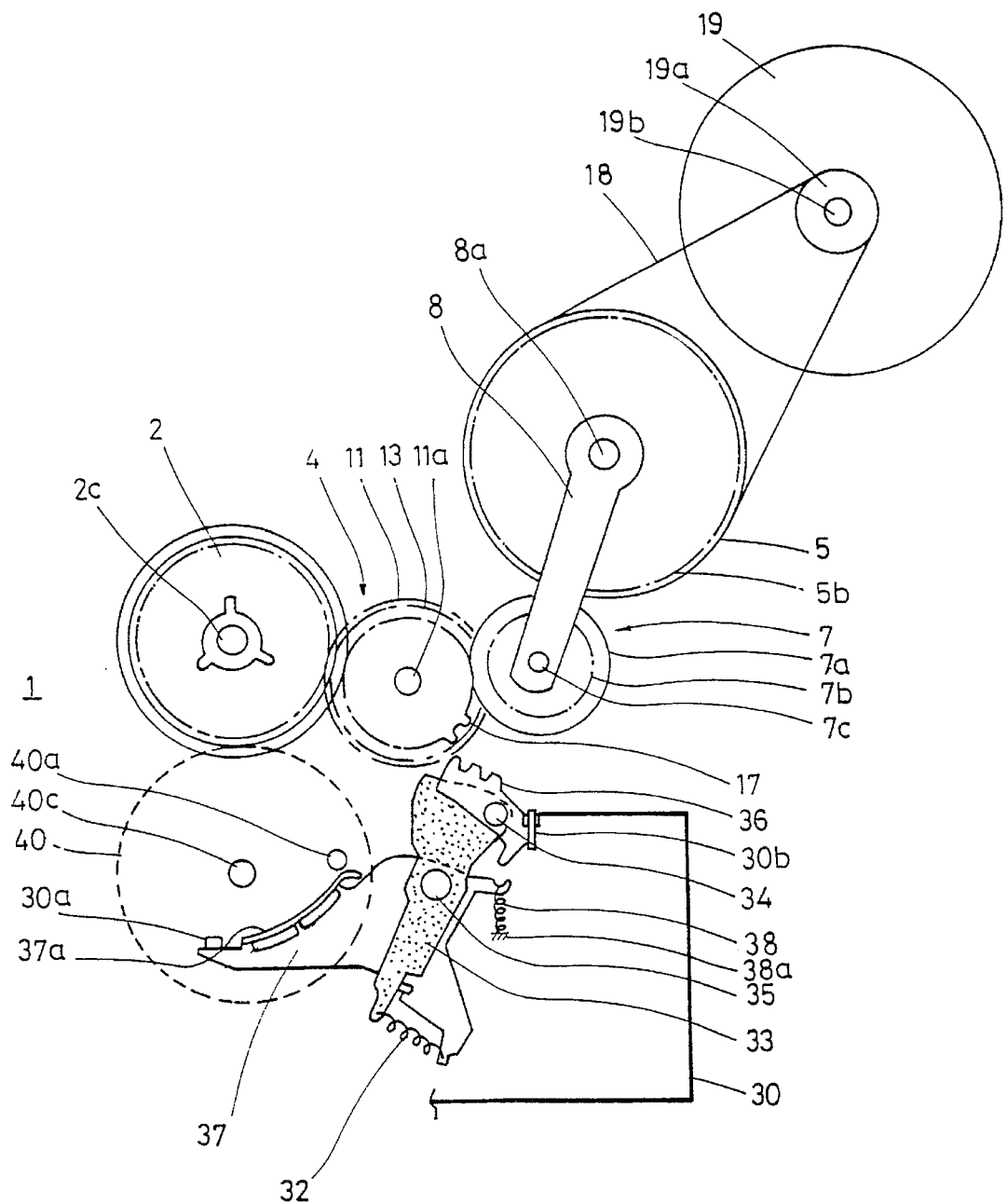
FIG. 1 is a schematic plan view of magnetic recording and reproducing apparatus having a typical jog device.
Figure 3:
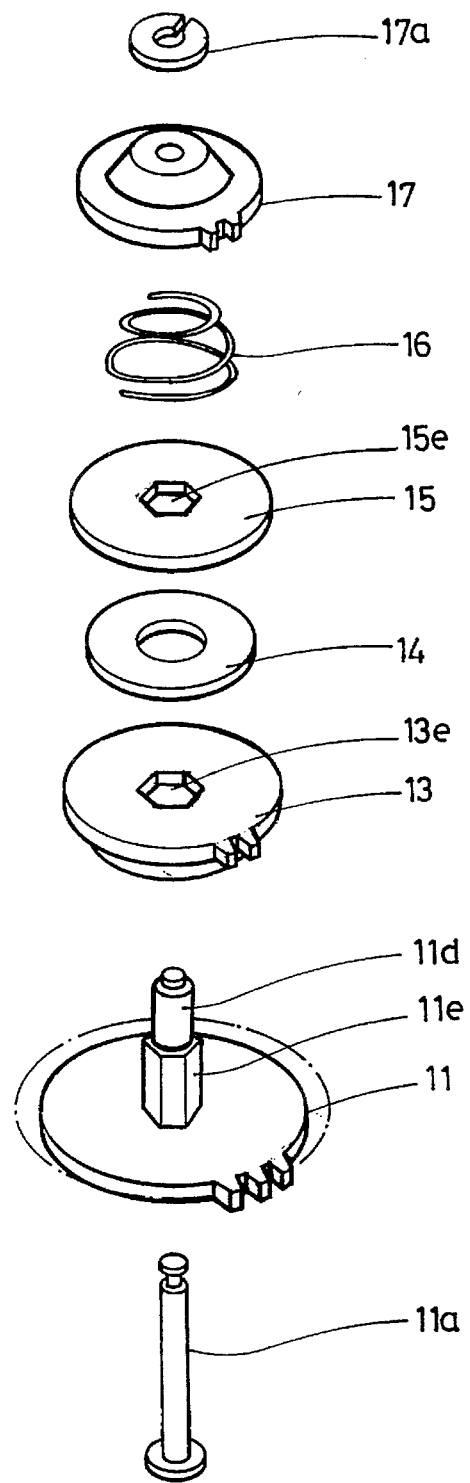
FIG. 3 is an exploded perspective view of a clutch of a tape supply reel assembly of the apparatus of FIG. 1.
Figure 4:
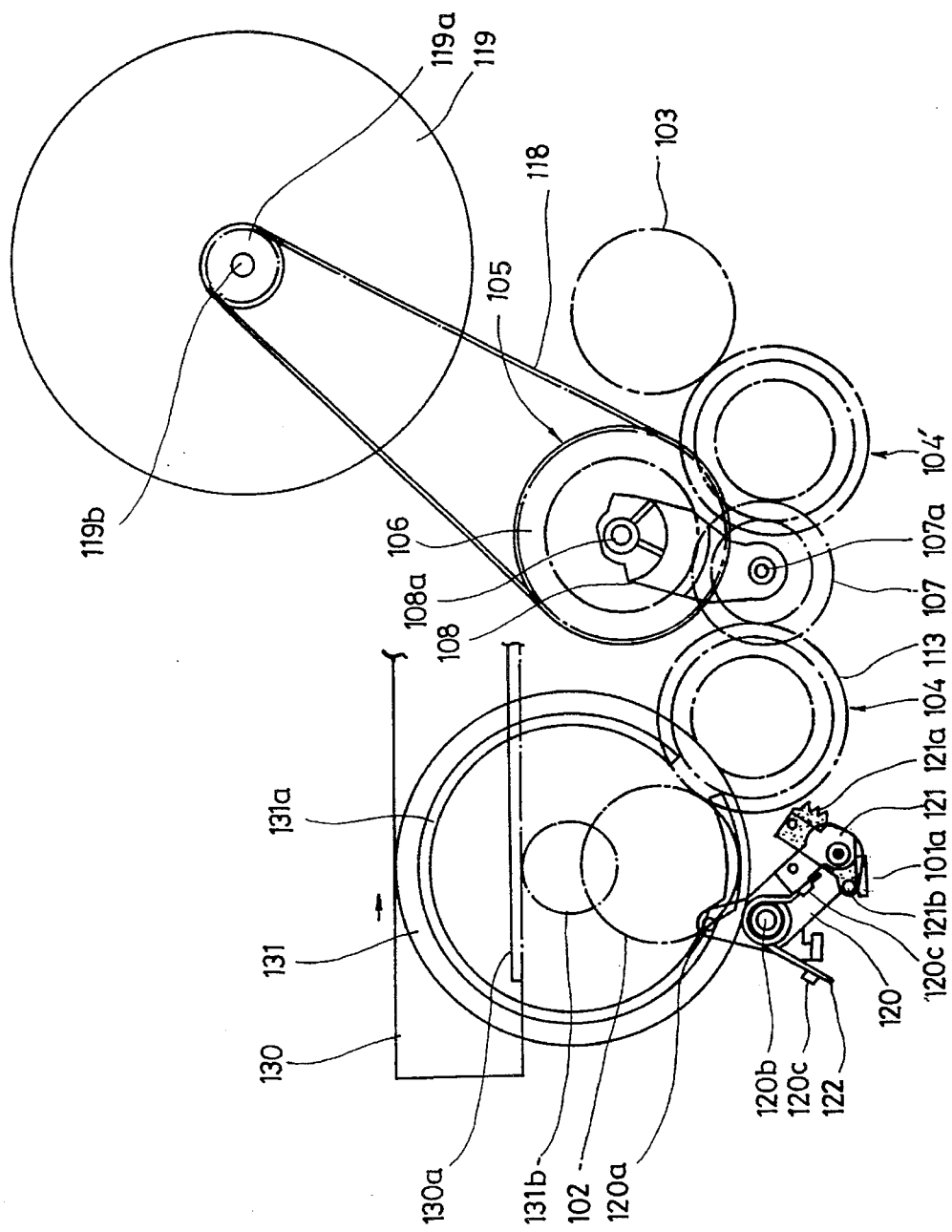
FIG. 4 is a plan view of magnetic recording and reproducing apparatus having a jog device in accordance with a preferred embodiment of the present invention, showing a state before a jog lever operation.

With reference to FIG. 4, there is shown in a plan view magnetic recording and reproducing apparatus having a jog device in accordance with a preferred embodiment of the present invention. This drawing shows a state of the apparatus before a jog lever operation.

As shown in this drawing, the magnetic recording and reproducing apparatus includes a capstan motor 119 which is mounted on a capstan shaft 119b placed on the bottom surface of a base plate 100. Fitted over the capstan shaft 119a on the bottom surface of the capstan motor 119 is a pulley 119a. An input gear pulley 106 is placed on the bottom center of a mode conversion function plate 130, which plate 130 in turn is laterally placed on the bottom surface of the base plate 100. The gear pulley 106 is connected to the pulley 119a of the capstan motor 119 through a belt 118 wrapped about both the pulleys 106 and 119a. The gear pulley 106 is rotatably mounted on a shaft 108a fixed to a portion of the base plate 1.

The magnetic recording and reproducing apparatus also includes an idler arm 108 whose one end is connected to the shaft 108a of the gear pulley 106 as shown in FIG. 6. The gear pulley 106 is fitted over the shaft 108a with interposition of a spring 110a. Mounted on the bottom surface of a front section of the idler arm 108 is a friction member 109. An idler 107 is fitted over a shaft 107a fixed to the front section of the idler arm 108. Fitted over the shaft 107a under the idler 107 are a coil spring 110 and a washer 105a.

As shown in FIGS. 4 and 6, a pair of clutches or a tape supply reel clutch 104 and a tape take-up reel clutch 104' are placed by both sides of the idler 107 respectively. The tape supply reel clutch 104 comprises a drive force output gear 111, a first friction member 112, a clutch gear 113, a second friction member 114, a washer 115, a coil spring 116 and a no-slip drive gear 117 directly coupled to the drive force output gear 111. All of the above elements of the clutch 104 is fitted over a shaft 111a fixed to the base plate 100 in order.

The apparatus further includes an idler mechanism 105 comprising the input gear pulley 106, the idler arm 108, both fitted over the shaft 108a. The idler mechanism 105 also includes the idler 107 fitted over the idler shaft 107a which in turn is coupled to the idler arm 108. With the above structure of the apparatus, the idler 107 is selectively engaged with either the tape supply reel clutch 104 or the tape take-up reel clutch 104' in accordance with a rotating direction of the gear pulley 106 rotated by the rotating force of an additional rotating force source, for example, a motor. Either the tape supply reel assembly 102 or the tape take-up reel assembly 103 is thus driven. Here, the rotating force of the additional rotating force source is transmitted to the gear pulley 106 through the belt 118.

In accordance with the structure of the above apparatus, a normal-direction reproducing mode or a reverse-direction reproducing mode may be carried out when the idler 107 of the idler mechanism 105 is engaged with the clutch gear 113 of the clutch 104. Meanwhile, when the idler 107 of the idler mechanism 105 is engaged with the no-slip drive gear 117 of the clutch 104, either the FF mode or the REW mode may be carried out. The idler arm 108 is constructed such that the arm 108 is ascended or descended by an additional lifting member (not shown) and makes the idler 107 be engaged with either the clutch gear 113 or the no-slip drive gear 117 in accordance with a mode of the magnetic recording and reproducing apparatus. From the above description, it will be noted that the power transmission mechanism of the magnetic recording and reproducing apparatus of the present invention is similar to that of the prior magnetic recording and reproducing apparatus.

The above magnetic recording and reproducing apparatus is provided with the jog device of the present invention.

The jog device of this invention is adapted to temporarily rotate the tape supply reel assembly 102 when the mode of the apparatus is converted from the normal-direction reproducing mode to the reverse-direction reproducing mode.

The jog device of this invention includes rotating means for temporarily rotating the clutch gear 113, which gear 113 is a slip gear for supplying a rotating force for the tape supply reel assembly 102, during a mode conversion of the magnetic recording and reproducing apparatus from the normal-direction reproducing mode into the reverse-direction reproducing mode, thus to cause the tape supply reel assembly 102 to be rotated by clutch force.

The rotating means of the jog device includes a clutch gear rotating unit which is temporarily rotated during the mode conversion from the normal-direction reproducing mode into the reverse-direction reproducing mode and temporarily rotates the clutch gear 113 of the clutch 104 until the mode conversion is finished. In order to rotate the above rotating unit unidirectionally, the rotating means of the jog device also includes an one way drive member. The rotating means further includes a returning unit for returning the clutch gear rotating unit to its original state in the normal-direction reproducing mode.

If schematically described, the clutch gear rotating unit of the rotating means of the jog device comprises a jog lever 120 and a gear lever 121. The gear lever 12 1, which is coupled to and cooperates with the jog lever 120, gears into and rotates the clutch gear 113. The one way drive member is a cam gear 131 which is driven by the mode conversion function plate 130. The returning unit of the rotating means includes biasing means for making the returning motion of the rotating unit be smooth and precise. The biasing means fitted over a rotating shaft of the rotating unit and stopped by a pair of arm stoppers.

The clutch gear rotating unit of the jog device will be described in detail below.

The jog lever 120 is mounted on the jog lever shaft 120b fixed to the bottom surface of the base plate 100. Here, the jog lever 120 is oriented to the tape supply reel assembly 102. The biasing means or a coiled torsion spring 122 is fitted over the jog lever shaft 120a when the mounting of the jog lever 120 on the shaft 120b has been finished. The opposed arms of the torsion spring 122 are caught by associated arm stoppers 120c provided on base plate 100 and stopper 120c provided on the jog lever 120 respectively so that the spring 122 is stably supported. The gear lever 121 is mounted on a shaft mounted on an end of the jog lever 120. The gear lever 121 is provided on its one end with a tooth part 121a which will gear into the clutch gear 113 of the clutch 104. In the embodiment shown in FIG. 4, the tooth part 121a of the gear lever 121 has three teeth, however, it should be understood that the number of teeth of the tooth part 121a of the gear lever 121 may be changed without affecting the functioning of this invention. The base plate 100 is also provided on the other end thereof with a stop pin 121b stopped by a projection stopper 101a when the jog lever 120 has returned to its state in the normal-direction reproducing mode of FIG. 4.

On the other hand, the mode conversion function plate 130 is mounted on the center of the bottom surface of the base plate 100. The function plate 130 is provided with a rack gear 130a which will gears into a pinion gear 131b of a cam gear 131. The surface of the cam gear 131 is provided with an annular cam slot 131a as shown in FIG. 4. This cam slot 131 a receives therein a cam pin 120a of the jog lever 120. The cam pin 120a vertically extends from the side surface of the other end portion of the jog lever 120.

In operation of the magnetic recording and reproducing apparatus, the rotational force of the capstan motor 119 is transmitted to the gear pulley 106 of the idler mechanism 105 through the pulley 119a of the capstan motor shaft 119b and the belt 118 wrapped about both the pulleys 106 and 119a. Therefore, either the tape supply reel assembly 102 or the tape take-up reel assembly 103 is driven and this causes either the tape supply reel or the tape take-up reel to take up the magnetic tape thereon. Thus, either the normal-direction reproducing mode or the reverse-direction reproducing mode is carried out.

When changing the rotating direction of the capstan motor 119 from the normal-direction to the reverse-direction in order to change the mode from the normal-direction reproducing mode to the reverse-direction reproducing mode, the idler 107 is disengaged from the clutch 104' of the tape take-up reel assembly 103 and, thereafter, engaged with the clutch 104 of the tape supply reel assembly 102 so as to drive this assembly 102. At this time, there is a time interval between the disengagement of the idler 107 from the tape take-up reel clutch 104' and the engagement of the idler 107 with the tape supply reel clutch 104. During the time interval, the tape supply reel assembly 102 is applied with no rotating force of the capstan motor 119 so that the assembly 102 can not be rotated.

However, the jog device of this invention temporarily drives the clutch 104 of the tape supply reel assembly 102 for the time interval between the timing of disengagement of the idler 107 from the clutch 104' of the tape take-up reel assembly 103 and the timing of engagement of the idler 107 with the tape supply reel clutch 104. Hence, the clutch 104 the tape supply reel assembly 102 can be temporarily rotated by clutch force during the time interval even when the rotating force of the capstan motor 119 is not transmitted to the assembly 102 during the time interval.

The jog lever 120 is assembled with a bracket cam assembly into a single body. However, it should be understood that the bracket cam assembly is not shown in FIG. 4 in order for prominently showing the jog lever 120.

The operational effect of the jog device according to the present invention will be described in detail below.

Figure 5:
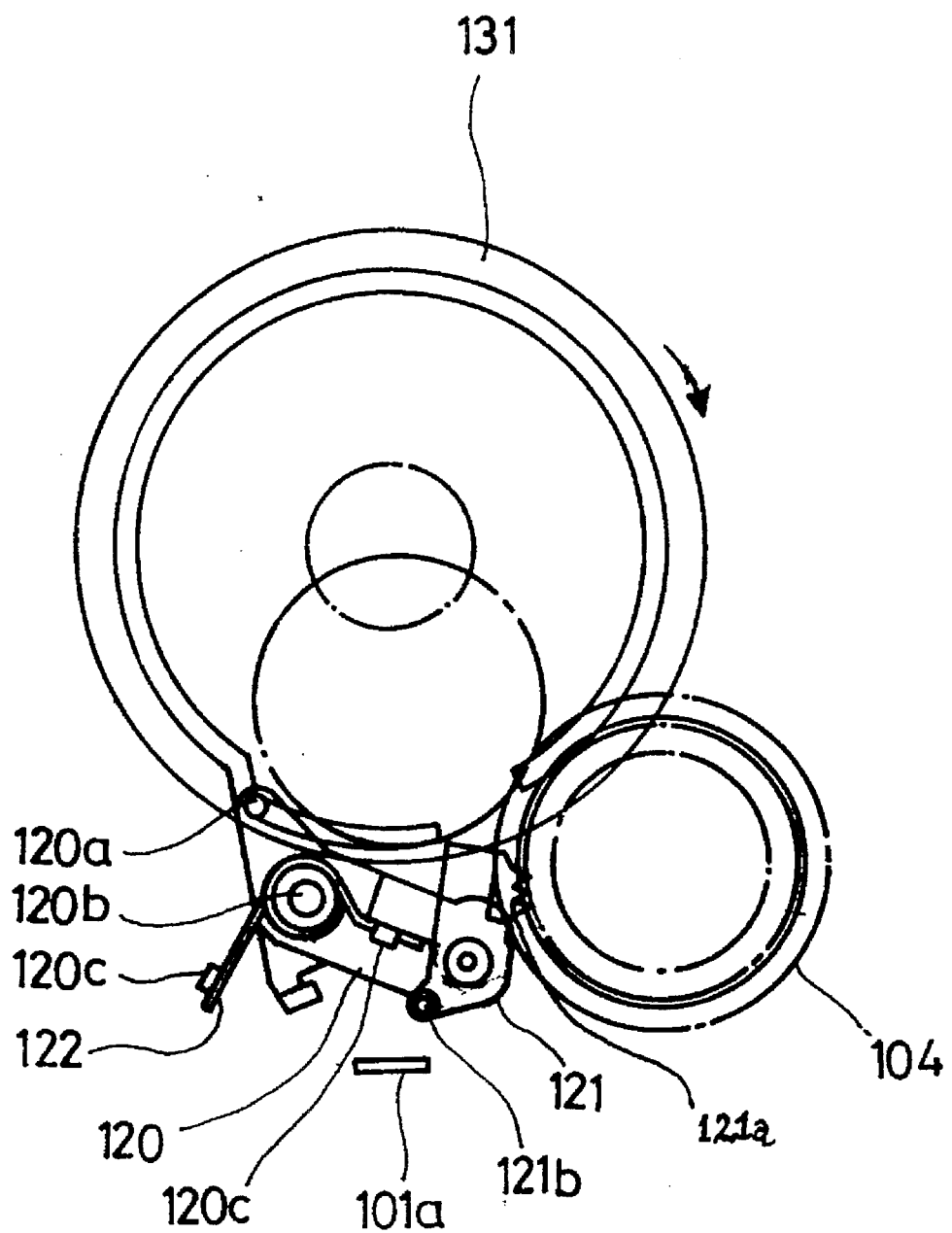
FIG. 5 is a plan view showing an operation of the jog lever of the jog device according to the present invention.

When converting a mode from a normal-direction running mode such as a PLAY mode or a SLOW mode to a reverse-direction running mode such as a reverse-direction reproducing mode or a reverse-direction slow mode by pushing an assigned key (not shown), the rotating direction of the capstan motor 119 is changed from the normal direction to the reverse direction (clockwise direction). At the same time of change of the rotating direction of the capstan motor 119, the function plate 130 is shifted rightward by an additional rotating force source as shown at the arrow of FIG. 4. The cam gear 131 is thus rotated clockwise so that the jog lever 120 is rotated counterclockwise by the motion of the cam pin 120a received in the cam slot 131a of the cam gear 131. Therefore, the jog lever 120 is shifted from the position of FIG. 4 to the position of FIG. 5. As a result of the counterclockwise rotation of the jog lever 20, the gear lever 121 coupled to the jog lever 120 is engaged with the clutch gear 113 of the tape supply reel clutch 104 so as to rotate this clutch gear 113. Hence, the drive force output gear 111 is rotated by a friction force of a first and a second friction members 112, 114 which is engaged at the clutch 104, the tape supply reel assembly 102 is rotated counterclockwise and temporarily takes up a predetermined amount of magnetic tape thereon.

When returning or convening the mode from the reverse-direction reproducing mode to the normal-direction reproducing mode, the mode conversion function plate 130 is shifted leftward and, at the same time, the cam gear 131 is rotated counterclockwise. Therefore, the jog lever 120 is rotated clockwise by the motion of the cam pin 120a received in the cam slot 131a of the cam gear 131. In order to prevent engagement of the tooth pan 121a of the gear lever 121 with the clutch gear 113 during the clockwise rotation of the jog lever 120 or during returning of the lever 120, the gear lever 121 may be kept in a counterclockwise levered state during the clockwise rotation of the jog lever 120. Alternatively, the gear lever 121 may be levered counterclockwise just when the gear lever 121 comes into contact with the clutch gear 113. When the jog lever 120 has returned from the position of FIG. 5 to the position of FIG. 4, the stop pin 121b of the gear lever 121 is stopped by the stopper 101a, thus to rotate the gear lever 121 clockwise and to return the lever 121 to its original position of FIG. 4.

As described above, the jog device for magnetic recording and reproducing apparatus in accordance with the present invention temporarily rotates a clutch gear of a tape supply reel assembly during a mode conversion of the magnetic recording and reproducing apparatus from a normal-direction reproducing mode into a reverse-direction reproducing mode, thus to cause the tape supply reel assembly to be rotated by clutch force. Therefore, the jog device of this invention minimizes variation of tape tension or variation of length of the tape running passage during the mode conversion from the normal-direction reproducing mode into the reverse-direction reproducing mode. The jog device thus prevents possible damage of the elements of the recording and reproducing apparatus caused by overload generated in the power transmission system of the apparatus. The jog device causes no overload to be applied to the capstan motor and prevents trouble of the capstan motor.

The jog device of this invention thus keeps clear picture during the mode conversion from the normal-direction reproducing mode into the reverse-direction reproducing mode or during a jog operation. This improves performance and reliability of the magnetic recording and reproducing apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A jog device for a magnetic recording and reproducing apparatus, comprising:

tape supply and tape take-up reel assemblies for winding a magnetic tape;

a rotating gear portion selectively engaged with said tape supply and tape take-up reel assemblies, respectively, having a clutch mechanism including respective clutch gears for transmitting a driving force of a capstan motor to said reel assemblies directly or by a clutch force by a slip; and rotating means for rotating said clutch mechanism of said rotating gear portion by a clutch force, due to slip from an additional driving source, thereby rotating said reel assemblies by a clutch force due to slip upon mode conversion, said rotating means including a clutch gear rotating unit, said unit being temporarily rotated during mode conversion so as to rotate said respective clutch gear of said tape supply reel clutch, said clutch gear rotating unit including a jog lever; a gear lever cooperating with said jog lever for selectively rotating said clutch gear of said tape supply reel clutch; a drive member for driving said clutch gear rotating unit during said mode conversion; and a returning unit for returning said clutch gear rotating unit during said mode conversion to a normal-direction reproducing mode state of said clutch gear rotating unit.

2. The jog device according to claim 1 wherein said gear lever is provided with:

a tooth part selectively gearing into said clutch gear, said tooth part being provided on one end portion of said gear lever; and a stop pin for levering said gear lever when said clutch gear rotating unit has returned to its normal-direction reproducing mode state, said stop pin being provided on the other end portion of the gear lever.

3. The jog device according to claim 2, further comprising a stopper for stopping said stop pin of the gear lever so as to lever the gear lever in cooperation with the stop pin when said clutch gear rotating unit has returned to its normal-direction reproducing mode state.

4. The jog device according to claim 1, wherein said drive member is a cam gear, said cam gear having a pinion gear gearing into and cooperating with a rack gear of a mode conversion function plate, said function plate being mounted on the center of the bottom surface of a base plate.

5. The jog device according to claim 4, wherein said cam gear is provided with a cam slot, said cam slot receiving a cam pin of said clutch gear rotating unit therein so that said clutch gear rotating unit is rotated by a motion of said cam pin cooperating with said cam slot.

6. The jog device according to claim 1, wherein said returning unit comprises:

a coiled torsion spring fitted over a rotating shaft of said clutch gear rotating unit, said spring having an arm on each end thereof; and a pair of arm stoppers for stopping the arms of the torsion spring respectively.

* * * * *